United States Patent [19]
Ellis

[11] 4,353,110
[45] Oct. 5, 1982

[54] SEARCH AND WARNING LIGHT SYSTEM
[76] Inventor: Richard D. Ellis, 6714 Dudley Ave., Minneapolis, Minn. 55428
[21] Appl. No.: 186,828
[22] Filed: Sep. 12, 1980
[51] Int. Cl.³ .............................................. F21V 21/30
[52] U.S. Cl. ....................................... 362/35; 362/66; 362/230; 362/231; 362/233; 362/240; 362/241; 362/252; 362/272
[58] Field of Search .................. 362/35, 66, 230, 231, 362/233, 240, 241, 252, 272

[56] References Cited
U.S. PATENT DOCUMENTS
2,218,013 10/1940 Tice et al. .............................. 362/35

Primary Examiner—Stephen J. Lechert, Jr.
Attorney, Agent, or Firm—Wicks & Nemer

[57] ABSTRACT

A search and warning light system is disclosed, in its preferred forms, as including a light assembly having first and second lamp assemblies. The light assembly is mounted about a vertical axis for rotation in either a clockwise or counterclockwise direction and the lamp assemblies are mounted to the light assembly about a horizontal axis for rotation in either an upward or downward direction. A control module located in a remote location provides appropriate electrical input to the motors controlling the rotation of the light assembly and the lamp assemblies, and to the lightbulbs included within the lamp assemblies. The motor for rotating the light assembly is located exteriorly of the light assembly in a first embodiment and is located interiorly of the light assembly in a second embodiment. The lamp assemblies can be independently rotated by providing separate motors and drive mechanisms or can be rotated together by rotatably relating the lamp assemblies.

13 Claims, 11 Drawing Figures

SEARCH AND WARNING LIGHT SYSTEM

BACKGROUND

This invention relates generally to search and warning light systems.

A need has arisen for search and warning light systems having numerous applications in emergency and service vehicles such as police cars, fire trucks, and similar uses, in aircraft, and in home or business surveillance and security. Specifically, a need has arisen for a unitized search and warning light system having warning, spot, or flood capabilities which can be utilized in search or warning light modes or a combination thereof.

SUMMARY

The present invention solves these and other problems by providing a novel search and warning light system. In the preferred embodiment, a first lamp assembly is provided, for emitting a beam of light, which is rotatable about a horizontal axis and a vertical axis. Therefore, the lamp assembly can be utilized as a search light by the slow rotation of the lamp assembly about its vertical and/or horizontal axis or can be utilized as a warning light by rotating the lamp assembly about its vertical and/or horizontal axes.

It is thus an object of the present invention to provide a novel search and warning light system.

It is a further object of the present invention to provide such a novel search and warning light system which has warning, spot, or flood capabilities, or a combination thereof.

It is a further object of the present invention to provide such a novel search and warning light system which can be operated in either a search or a warning light mode or can be simultaneously operated in a search and warning light mode.

It is a further object of the present invention to provide such a novel search and warning light system which is unitized.

It is a further object of the present invention to provide such a novel search and warning light system which can be flush mounted.

It is a further object of the present invention to provide such a novel search and warning light system which can be operated from a remote location such as within the interior of the vehicle upon which the system is mounted.

These and further objects and advantages of the present invention will become clearer in light of the following detailed description of illustrative embodiments of this invention described in connection with the drawings.

DESCRIPTION OF THE DRAWINGS

The illustrative embodiments may best be described with reference to the accompanying drawings where.

All figures are drawn for the ease of explanation of the basic teachings of the present invention only. Extensions of the figures with respect to number, position, relationship, and dimensions of the parts to form preferred embodiments will be explained or will be within the skill of the art after the following teachings of the present invention have been read and understood.

Where used in various figures of the drawings, the same numeral designates the same or similar parts in the systems. Furthermore, when the terms "top," "bottom," "right," "left," "vertical," "horizontal," and similar terms are used herein, it should be understood that these terms have reference only to the structures shown in the drawings as it would appear to a person viewing the drawings and are utilized only to facilitate describing the invention.

DESCRIPTION

In the figures, a search and warning light system according to the teachings of the present invention is shown and generally designated 10. System 10 generally includes a light assembly 12 and a drive motor assembly 14 for rotating light assembly 12 about a vertical axis in a horizontal plane in either a clockwise or counterclockwise rotation.

Light assembly 12 generally includes a housing 16, a first dome 18, and a second dome 20. Domes 18 and 20 are made of high impact plastic and can be clear, red, blue, or other color. Housing 16 is made of suitable high strength material such as stainless steel and preferrably has an egg shaped vertical cross section and a rectangular shaped horizontal cross section. Housing 16 generally includes an outside casing wall 22 which encircles the ends and top and bottom of housing 16 and first and second side walls 24 and 26.

Figures 1, 2, 3, 4, 8:
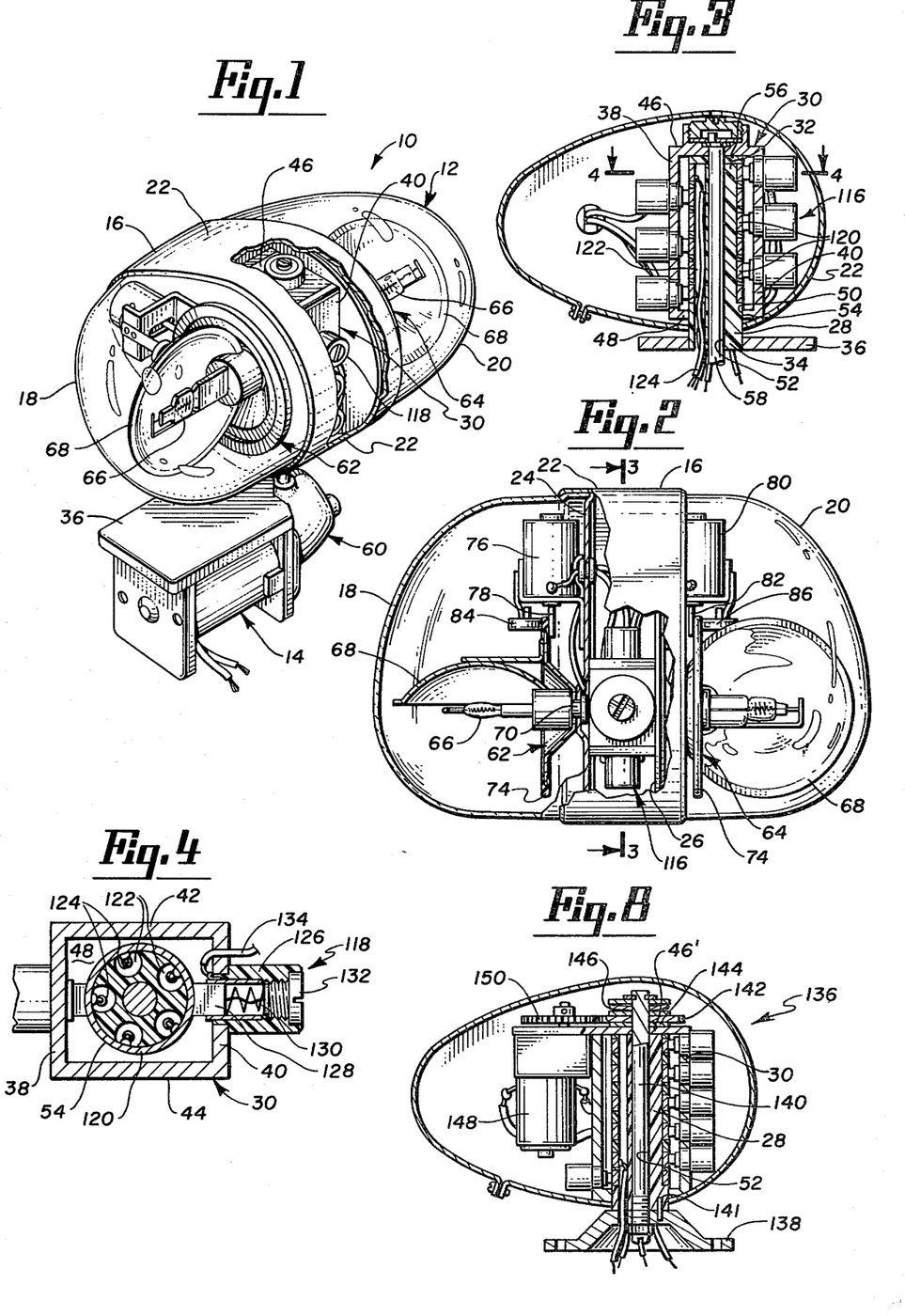
FIG. 1 shows a perspective view of a search and warning light system according to the teachings of the present invention, with portions of the system being broken away.
FIG. 2 shows a top view of the system of FIG. 1, with portions of the system being broken away.
FIG. 3 shows a cross-sectional view of the system of FIG. 1 according to Section Lines 3—3 of FIG. 2.
FIG. 4 shows a cross-sectional view of the system of FIG. 1 according to Section Lines 4—4 in FIG. 3.
FIG. 8 shows a cross-sectional view of another embodiment of a search and warning light system according to the teachings of the present invention.

Housing 16 is rotatably mounted to a cylindrical support post 28 by a rectangular box member 30. Support post 28 has a first end 32 and a second end 34 fixedly secured to a suitable support surface 36 which may be part of a police utility bar or other supporting structure. As best seen in FIGS. 3 and 4, box member 30 includes first and second side walls 38 and 40, ends 42 and 44, a top 46, and a bottom 48. Box member 30 extends between and is attached to side walls 24 and 26 of housing 16 by ends 44 and 42, respectively.

Support post 28 is cylindrical in shape and has an outside surface 50 and further includes a central bore 52 which extends along its central, vertically arranged, axis. In the preferred embodiment, post 28 is made of suitable nonconductive structural material such as plastic.

Bottom 48 of box number 30 includes an aperture 54 of a size substantially equal to but slightly greater than the cross section of post 28. Therefore, box member 30 can be positioned such that post 28 extends through aperture 54 into the interior of box member 30 such that top 46 of box member 30 operatively rests on end 32 of post 28. In the preferred embodiment, a suitable bearing member 56 is located between top 46 of box 30 and end 32 of post 28 to reduce the rotational friction therebetween.

Figures 5, 6:
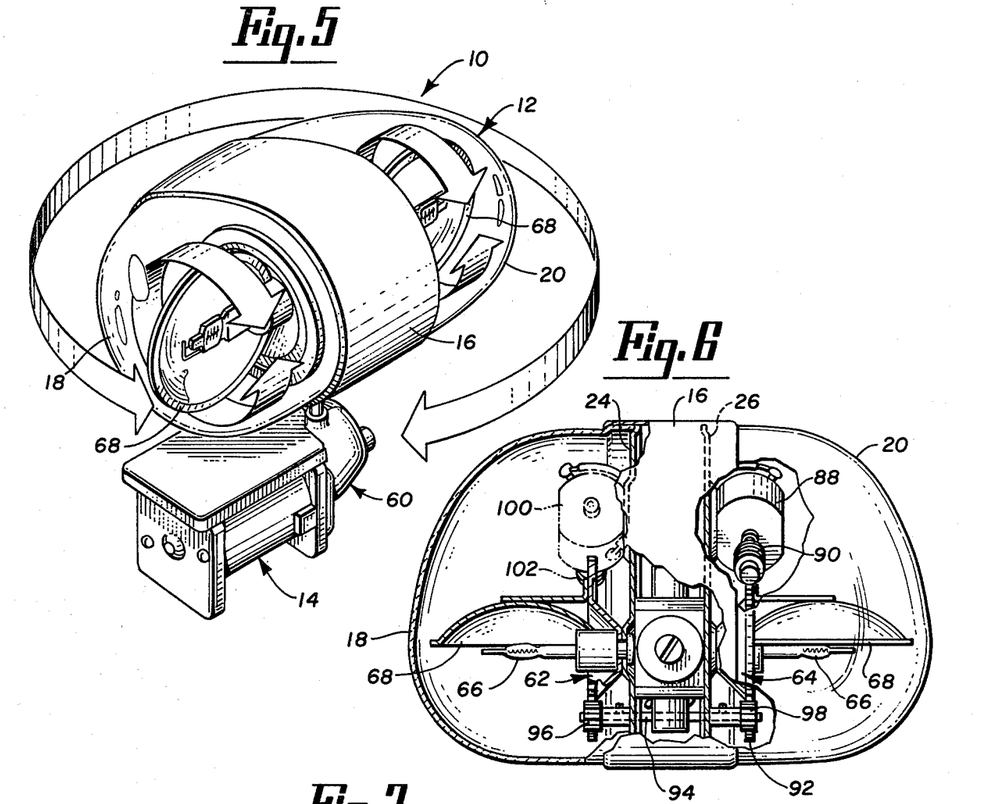
FIG. 5 shows a perspective view of a search and warning light system according to the teachings of the present invention showing diagrammatically the operation thereof.
FIG. 6 shows a top view of another embodiment of a search and warning light system according to the teachings of the present invention, with portions of the system being broken away.

A shaft 58 rotatably extends through bore 52 of post 28 and is threadably engaged in a nonrotating manner to top 46 of box member 30. Therefore, box member 30 and light assembly 12 are fixedly secured or are in a nonrotatable relation to shaft 58. Shaft 58 is operatively connected to motor 14 by suitable gear mechanism 60. Therefore, box member 30 and specifically light assembly 12 can be rotated by motor 14 in a horizontal plane about the vertical axis defined by shaft 58 inside post 28. In the preferred embodiment, motor 14 can operate in either direction such that shaft 58 and thus light assembly 12 can be rotated in either a clockwise or a counterclockwise direction as shown in FIG. 5.

Fixedly secured to sidewalls 24 and 26 of housing 16 along a horizontal axis are first and second lamp assemblies 62 and 64 which act as a source of light. Lamp assemblies 62 and 64 include lightbulbs 66 which may be of the non-reflectorized, clear, halogen type and associated parabolic mirrors 68 for concentrating a beam of light. Parabolic mirrors 68 are mounted to sidewalls 24 and 26 for rotation on hubs 70 on a horizontal axis along lightbulbs 66. Hubs 70 further include drive wheels 74 attached thereto. Bulbs 66 may be of several types such as either monofiliment or double filiment and allowing lamp assemblies 62 and 64 to be of warning, flood, or spot type, or a combination thereof.

Several methods and arrangements exist for rotating lamp assemblies 62 and 64 in either a clockwise or counterclockwise direction about a horizontal axis of hubs 70 by driving wheels 74. A first preferred form of the drive mechanism is shown in FIGS. 1 to 4 and includes a first motor 76 mounted to wall 24 having a drive shaft 78, a second motor 80 mounted to wall 26 having a drive shaft 82, a first press wheel 84, and a second press wheel 86. In the first preferred form, drive shaft 78 engages with and directly drives wheel 74 of lamp assembly 62 and shaft 82 engages with and directly drives wheel 74 of lamp assembly 64. Press wheels 84 and 86 press against wheels 74 of lamp assemblies 62 and 64, respectively, to insure that wheels 74 engage with shafts 78 and 82 in a non-slipping relation.

Since two motors 80 and 84 are provided for rotating lamp assemblies 62 and 64, lamp assemblies 62 and 64 can be driven independently. For example, lamp assemblies 62 and 64 can be rotated in the same direction at the same rotational speed, or at different rotational speeds, or can be rotated in opposite directions at the same rotational speed, or at different rotational speeds. Further, lamp assemblies 62 and 64 can both be held in a desired stationary position or one can be held in a desired stationary position while the other rotates in either direction at any rotational speed.

A second preferred form of the drive mechanism for lamp assemblies 62 and 64 is shown in FIG. 6 and includes gear teeth 92 formed on the outer circumference of wheels 74 of lamp assemblies 62 and 64. A first motor 88 is provided having a drive shaft including a worm drive gear 90 in gearing engagement with gear teeth 92 of wheel 74 of light assembly 64. Further included is a transfer shaft 94 which is rotatably mounted through sidewalls 24 and 26 of housing 16. Shaft 94 includes sprockets 96 and 98 in gearing engagement with gear teeth 92 of wheels 74 of assemblies 62 and 64, respectively, and thus rotatably relate lamp assemblies 62 and 64. Thus, motor 88 rotates lamp assembly 64 along its horizontal axis about hub 70 which in turn rotates lamp assembly 62 along its horizontal axis about hub 70 as a result of shaft 94 and sprockets 96 and 98. Therefore, when motor 88 is activated, lamp assemblies 62 and 64 are rotated about their horizontal axes and at the same rate of speed by shaft 94 and sprockets 96 and 98. The direction of lamp assemblies 62 and 64 can be the same as shown in FIG. 6 or can be orientated with respect to each other.

It should be noted that the second preferred embodiment of the drive mechanism of lamp assemblies 62 and 64 of FIG. 6 can be easily modified to include an independent drive of a type similar to that shown in FIGS. 1 to 4. Specifically, a second motor 100 having a drive shaft including a worm drive gear 102 can be provided in gearing engagement with gear teeth 92 of wheel 74 of lamp assembly 62 as shown in phantom in FIG. 6. Shaft 94 and sprockets 96 and 98 can then be omitted such that light assemblies 62 and 64 are independently driven by motors 100 and 88, respectively.

Figure 7:
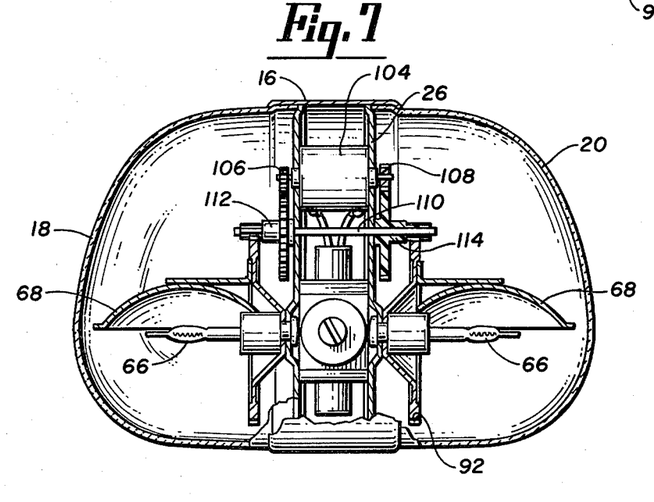
FIG. 7 shows a top view of another embodiment of a search and warning light system according to the teachings of the present invention, with portions of the system being broken away.

A third preferred embodiment of the drive mechanism for lamp assemblies 62 and 64 of the present invention is shown in FIG. 7 and includes a single motor 104 mounted between walls 24 and 26. Motor 104 has dual drive shafts including gears 106 and 108 located on opposite ends thereof. Gear teeth 92 are formed on the outer circumference of wheels 74 of lamp assemblies 62 and 64. Further included is an idler shaft 110 which is rotatably mounted between walls 24 and 26 and includes compound gears 112 and 114 located on opposite ends thereof. Compound gear 112 is in gearing engagement with gear 106 and gear teeth 92 of wheel 74 of lamp assembly 62 and compound gear 114 is in gearing engagement with gear 108 and gear teeth 92 of wheel 74 of lamp assembly 64. Therefore, when motor 104 is activated, lamp assemblies 62 and 64 are rotated at the same rate of speed by shaft 110 and gears 106, 108, 112, and 114. Lamp assemblies 62 and 64 can have the same orientation as shown in FIG. 7 but may also have different orientations to each other, if desired.

It should be noted that shaft 110 and gears 112 and 114 rotatably relate lamp assemblies 62 and 64 such that one of the drive shafts and its associated gears 106 and 108 can be omitted. Likewise, using motor 104 having dual drive shafts including gears 106 and 108, shaft 110 can be omitted with gears 112 and 114 being independently mounted on walls 24 and 26, respectively.

For providing electrical input to lightbulbs 66 and motors 76, 80, 88, 100, or 104, a suitable commutator assembly 116 is provided, a preferred form of which is best seen in FIGS. 3 and 4. Specifically, assembly 116 includes brush assemblies 118 each having associated contact rings 120 formed on outside surface 50 of post 28. Post 28 further includes vertical bores 122 which are concurrent with outside surface 50 of post 28 for receiving electric wires 124 of the control module 125 for making electrical connection with the inside or back side of rings 120. Rings 120 in the preferred embodiment are counter sunk in outside surface 50 of post 28 and thus are flush with outside surface 50.

Brush assemblies 118 are preferrably horizontally mounted in side walls 38 and 40 of box member 30 and include a brush holder 126 which slidably receives a brush 128. Brush 128 is biased toward ring 120 by a spring 130. Holder 126 further includes a threadably secured end 132 allowing placement of spring 130 and brush 128 in holder 126 and also allowing servicing thereof. Electric wire 134 of light assembly 12 is in electrical contact and connection to brush 128 in a manner well known in the brush assembly art.

Thus, commutator assembly 116 allows electrical connection between the control module 125 of system 10 and light assembly 12, although light assembly 12 is mounted for rotation in a horizontal plane about a vertical axis. Specifically, when light assembly 12 is rotated about its vertical axis, box member 30 is rotated on post 28 by turning shaft 58. Since brush assemblies 118 are mounted in box member 30, brushes 128 move around and along rings 120 attached to post 28. Thus, electric connection can be made between wires 124 and 134 of the control module 125 and light assembly 12, respectively, through rings 120 and brush assemblies 118.

An alternate embodiment of system 10 is shown in FIG. 8 and is generally designated 136. System 136 includes a flush mounting bracket 138 which can be attached to a supporting structure such as the hood or roof of a vehicle such as a law enforcement vehicle. Post 28 is secured to bracket 138 in a nonrotatable manner with the aid of pin 141. Shaft 140 extends through bore 52 of post 28 and through top 46' of member 30 and is also secured to bracket 138 in a nonrotatable manner. Member 30 and thus light assembly 12 are in a rotatable relation with shaft 140 and also post 28. A gear 142 is secured to shaft 140 above top 46' of member 30 in a nonrotatable manner. A suitable bearing member 144 can be positioned between gear 142 and top 46' of member 30 to reduce the rotational friction therebetween. Suitable biasing members 146 can be provided for biasing gear 142 on bearing member 144 and thus for biasing member 30 on post 28. Members 146 are shown in the preferred embodiment as including a friction washer biased against gear 142 by a thrust washer which abuts against a washer held on shaft 140 by a snap ring.

System 136 further includes a motor 148 having a drive shaft including a sprocket 150 in gearing engagement with gear 142. Motor 148 is mounted and secured to side wall 38 of member 30 of light assembly 12. Thus, when motor 148 is activated turning sprocket 150, member 30 and light assembly 12 rotate about post 28 because of the nonrotatable relation of gear 142 to shaft 140, post 28, and mounting bracket 138.

System 136 then further includes lamp assemblies 62 and 64 and drive mechanisms therefor which may be of the type shown in FIGS. 1 to 7. System 136 then has one major advantage over system 10. Specifically, motor 148 is mounted within light assembly 12 allowing bracket 138 to be mounted directly to a support surface such as to a vehicle without major modification to the surface whereas in system 10, motor 14 and gear mechanism 16 usually is mounted beneath the support surface or within a utility bar. Further, system 136 is of a smaller overall size than that of system 10.

Now that the basic components of systems 10 and 136 have been set forth, the features of the present invention can be explained and appreciated. As stated hereinbefore, lightbulbs 66 and lamp assemblies 62 and 64 can be of several types such as of the warning, spot, or flood variety or a combination thereof. Thus, the combinations are unlimited allowing use of system 10 or 136 in numerous applications such as in emergency and service vehicles, aircraft, and home or business surveillance and security. Therefore, only three uses of the present invention will be explained; however, after the teachings of the present invention become known, other applications and uses will be obvious to a person skilled in the art.

Systems 10 and 136 can be used in a full warning light capacity. Specifically, lamp assemblies 62 and 64 can be rotated about their horizontal axes simultaneously as light assembly 12 is rotated about its vertical axis. The light pattern made by system 10 or 136 is then a function of the relative rotational speeds and directions of lamp assemblies 62 and 64 and light assembly 12. For example, at high rotational speeds of lamp assemblies 62 and 64 and light assembly 12, a full sphere is illuminated. However, with the independent drive mechanism, lamp assemblies 62 and 64 can be rotated at the same speed or at different speeds and in the same direction or opposite directions. Furthermore, light assembly 12 can be rotated at various speeds in either direction. Thus, the pattern and degree of the sphere illuminated can be varied regulating the rotation speeds and direction of lamp assemblies 62 and 64 and of light assembly 12 by suitable controls in control module 125 of system 10 or 136.

Additionally, system 10 or 136 can be used in a combination search and warning light capacity. Specifically, lamp assembly 62 can be operated in a warning light capacity by rotating it about its horizontal axis at the desired speed and direction while lamp assembly 64 can be operated in a search light capacity by holding it in a stationary position. It should then be noted that the light beam emitted from lamp assembly 64 operating in the search light capacity can be directed in any direction by slowly rotating lamp assembly 64 and/or light assembly 12. Further, lamp assembly 64 operating in its search light capacity can be used as a scanner by slowly rotating lamp assembly 64 and/or light assembly 12.

Furthermore, system 10 or 136 can be used in a search light capacity. Specifically, lamp assemblies 62 and 64 can both be operated in search light capacities. Further, lamp assemblies 62 and 64 can be directed in the same direction or different directions. Additionally, the direction of lamp assemblies 62 and 64 can be changed by rotating lamp assemblies 62 and/or 64 and/or light assembly 12. Furthermore, lamp assemblies 62 and/or 64 can be used as a scanner by slowly rotating lamp assemblies 62 and/or 64 and/or light assembly 12.

Figure 9:
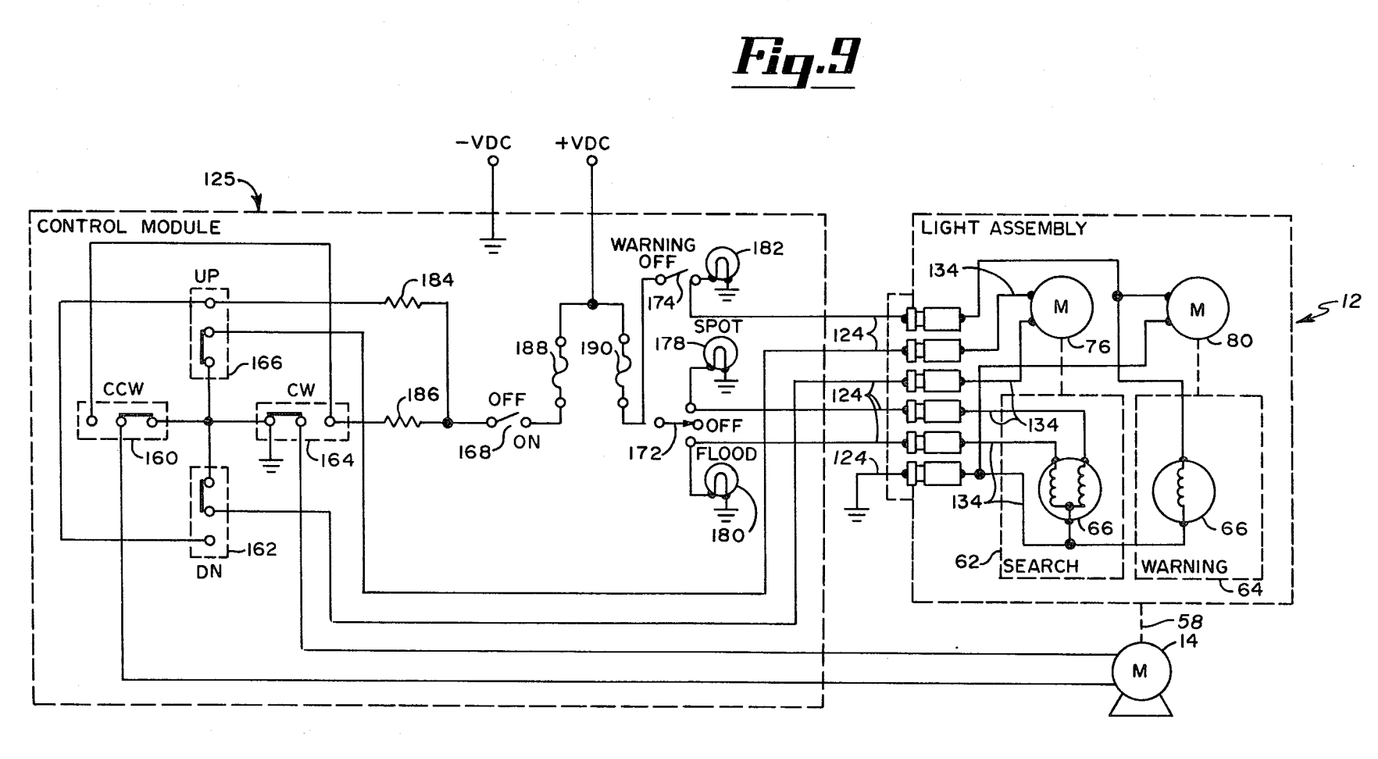
FIGS. 9-11 show exemplary electrical schematics for the search and warning light systems of FIGS. 1-8.
Figure 10:
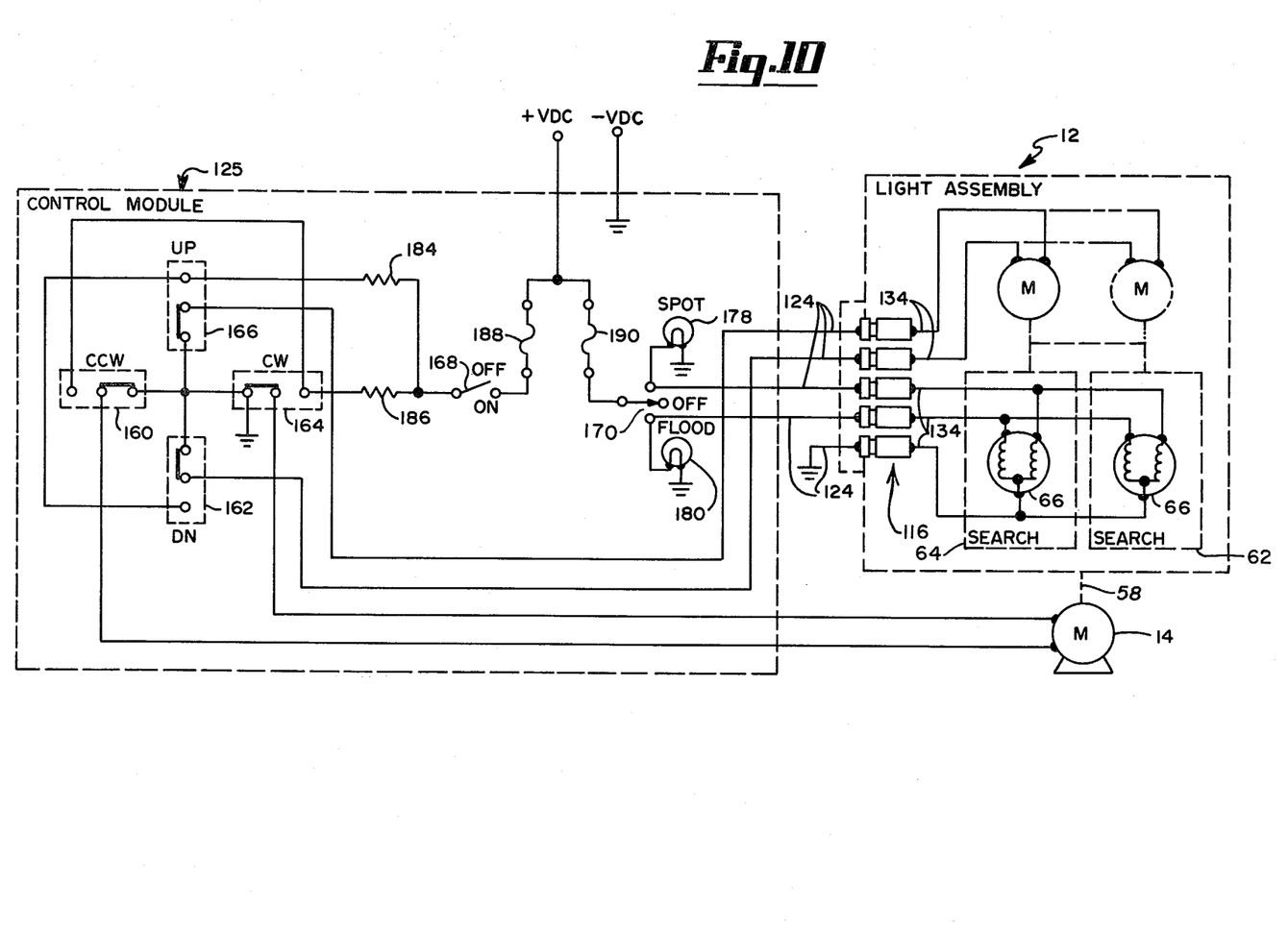
Figure 11:
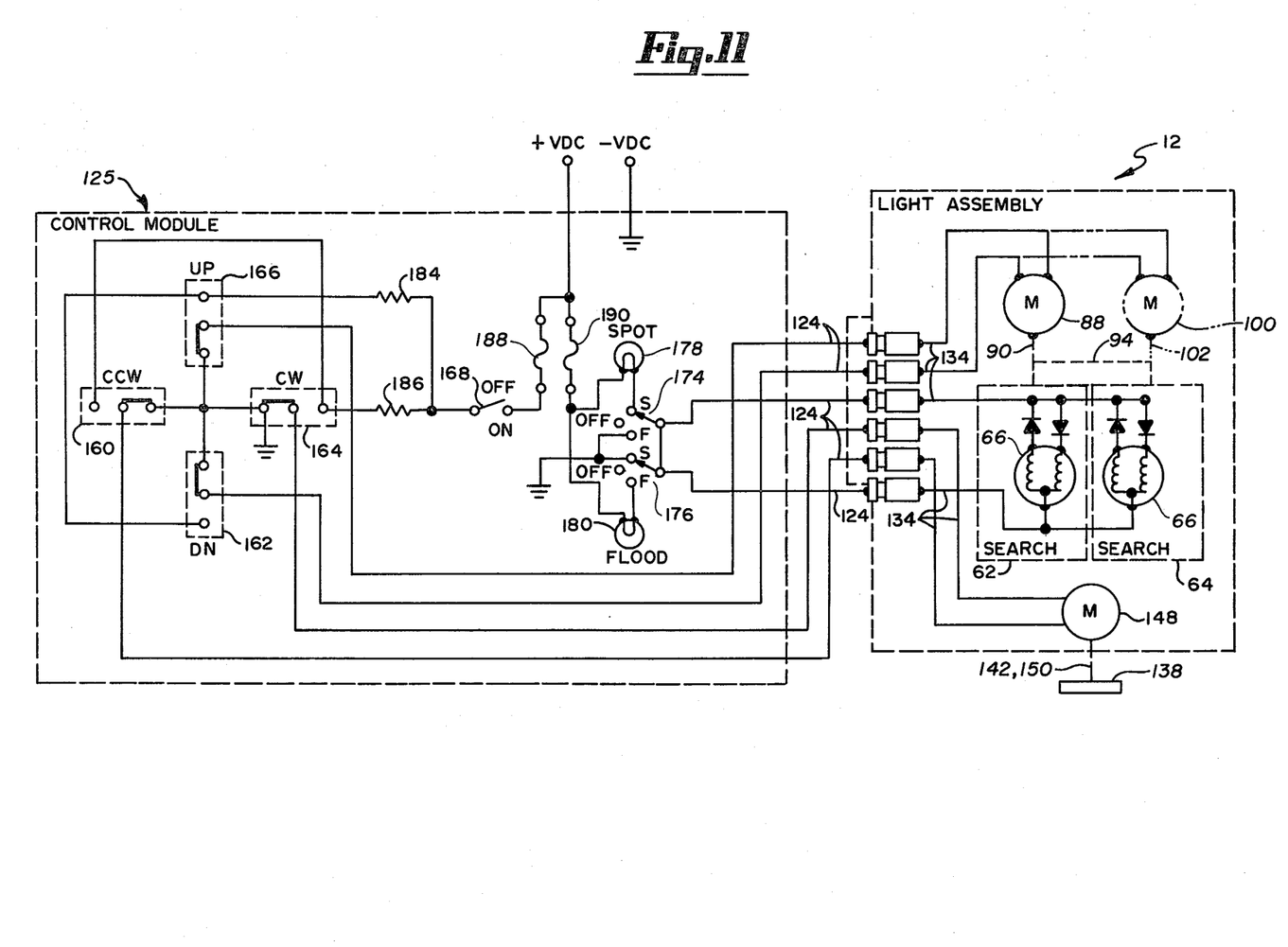

System 10 or 136 is then operated by control module 125 which can be located in a remote location such as within the vehicle upon which system 10 or 136 is mounted. Specifically, system 10 or 136 is operated by providing the appropriate electrical input to the light assembly drive motor, to the lamp assembly drive motors, and to lightbulbs 66. Control module 125 for operating system 10 or 136 can be of various constructions depending upon the use and features of system 10 or 136 desired. The present invention is too versatile to describe each and every mode of control module 125 possible with a schematic and beyond the description already given. Therefore, three schematics will be set forth to show preferred embodiments of the control module 125. Other modes of the control module will then be obvious to persons skilled in the electrical arts from the schematics and the description provided hereinbefore and hereinafter. For the sake of example, then, electrical schematics for control module 125 and systems 10 and 136 are shown in FIGS. 9–11, with associated pilot lights 178, 180, and 182, fuses 188 and 190, resistor 184 and 186, ON-OFF switches 168 and 174, other switches 170, 172, 174, and 176, wiring, and two position, center OFF control switches 160, 162, 164, and 166 which are selectively activated to complete and energize the appropriate electrical circuit and allow the applications of the present invention to perform the functions desired. FIG. 9 is the electrical schematic for the embodiment of FIGS. 1–4. FIG. 10 is the electrical schematic for the embodiments of FIGS. 6 and 7. FIG. 11 is the electrical schematic for the embodiment of FIG. 8.

Specifically, FIG. 9 illustrates the best mode of a police function of separate warning and spot/search or flood/search capabilities, light assembly 12 being rotatable in a clockwise or counterclockwise direction, the search lamp assembly shown in the preferred form as being lamp assembly 62 being rotatable up or down, and warning light assembly shown in the preferred form as being lamp assembly 64 being independently actuable, with motor 80 and bulb 66 of lamp assembly 64 being simultaneously actuable for quick action capabilities.

FIG. 10 illustrates the best mode of a function of dual search capabilities, with each mode having spot and flood capabilities, light assembly 12 being rotatable in either a clockwise or counterclockwise direction, the lamp assemblies being rotatable either up or down and rotatably related, with the light assembly motor being located exteriorly of the light assembly 12.

Likewise, FIG. 11 illustrates another mode having the same function as the mode of FIG. 10 with the exception that the motor which rotates light assembly 12 being mounted interiorly of light assembly 12.

When system 10 or 136 is used in a search light capacity, it is desired that light assembly 12 and lamp assemblies 62 and 64 be capable of moving at high speeds but also be capable of stopping instantaneously thereby giving the operator precise control of the search light. Thus, suitable braking means may be provided for stopping movement of light assembly 12 and lamp assemblies 62 and 64 when electrical connection to the drive motors therefore have been broken. In the preferred embodiment, this is accomplished by utilizing motors having permanent magnets and having the motor circuit close or short circuit when the control switch is in its rest or neutral position. Friction between the components of systems 10 and 36 can also be utilized for braking purposes and can then be adjusted by the materials used in construction, the use of lubricants, and the degree to which the components are biased or fitted with each other. Electrical braking is also possible along with other means.

To prevent damage to the drive mechanisms of systems 10 and 136 if assemblies 12, 62, and 64 are manually rotated, the drive mechanisms of the preferred embodiments include a slip drag clutch type relation.

Now that the basic teachings of the present invention have been explained, many extensions and variations will be obvious to one having ordinary skill in the art. For example, housing 16 and domes 18 and 20 shown and described herein are of the preferred construction and other forms and shapes can be used according to the particular use of system 10 or 136 desired.

Thus, since the invention herein may be embodied in other specific forms without departing from the spirit or the general characteristics thereof, some of which forms have been indicated, the embodiments described herein are to be considered in all respects illustrative and not restrictive. The scope of the invention is indicated by the appended claims, rather than by the foregoing description and all changes which come within the meaning and range of equivalency of the claims are intended to be embraced therein.

I claim:

1. A search and warning light system comprising, in combination: at least a first lamp assembly for emitting a beam of light; first means for rotating the first lamp assembly about a horizontal axis; second means for rotating the first lamp assembly about a vertical axis; and third means for providing electric connection to the lamp assembly and the first and second means allowing the lamp assembly to be used as a search light with the direction of the beam of light being changeable by slow rotation of the lamp assembly about its vertical and/or horizontal axis by the first and second means and allowing the lamp assembly to be used as a warning light by rotating the lamp assembly about its vertical and/or horizontal axis by the first and second means.

2. The search and warning light system of claim 1 further comprising, in combination: a second lamp assembly for emitting a beam of light, wherein the first means also rotates the second lamp assembly about the horizontal axis, and wherein the second means also rotates the second lamp assembly about the vertical axis.

3. The search and warning light system of claim 2 wherein the first means allows the independent rotation of the first and second lamp assemblies about the horizontal axis allowing the first lamp assembly to be used as a search light with the direction of the beam of light being changable by slow rotation of the first lamp assembly about its vertical and/or horizontal axis by the first and second means and allowing the second lamp assembly to be simultaneously used as a warning light by rotating the lamp assembly about the horizontal axis by the first means.

4. The search and warning light system of claim 3 wherein the first means comprises, in combination: a first drive wheel formed on the first lamp assembly; means for rotating the first drive wheel comprising a first motor having a drive shaft, with the drive shaft of the first motor being in driving engagement with the first drive wheel; a second drive wheel formed on the second lamp assembly; and means for rotating the second drive wheel comprising a second motor having a drive shaft, with the drive shaft of the second motor being in driving engagement with the second drive wheel.

5. The search and warning light system of claim 3 wherein the first means comprises, in combination: a first drive wheel formed on the first lamp assembly and having gear teeth; means for rotating the first drive wheel comprising a first motor having a drive shaft with a drive gear in gearing engagement with the gear teeth of the first drive wheel; a second drive wheel formed on the second lamp assembly and having gear teeth; and means for rotating the second drive wheel comprising a second motor having a drive shaft with a drive gear in gearing engagement with the gear teeth of the second drive wheel.

6. The search and warning light system of claim 2 wherein the first means comprises, in combination: a first drive wheel formed on the first lamp assembly and having gear teeth; a second drive wheel formed on the second lamp assembly and having gear teeth; means for rotatably relating the first and second drive wheels comprising a rotatable shaft having a first sprocket located on its first end and a second sprocket located on its second end, with the first sprocket being in gearing engagement with the gear teeth of the first drive wheel and with the second sprocket of the shaft being in gearing engagement with the gear teeth of the second drive wheel; and means for rotating the first drive wheel comprising a first motor having a sprocket in gearing engagement with the gear teeth of the first drive wheel.

7. The search and warning light system of claim 2 wherein the first means comprises, in combination: a first drive wheel formed on the first lamp assembly and having gear teeth; a second drive wheel formed on the second lamp assembly and having gear teeth; means for rotatably relating the first and second drive wheels comprising a shaft having a first sprocket located on its first end and a second sprocket located on its second end, with the first sprocket being in gearing engagement with the gear teeth of the first drive wheel and with the second sprocket being in gearing engagement with the gear teeth of the second drive wheel; and means for rotating the shaft including a motor having a drive shaft with a sprocket in gearing engagement with the shaft.

8. The search and warning light system of claim 1 wherein the second means comprises, in combination: a vertical shaft, with the lamp assembly being in a nonrotatable relation with the shaft; and means for rotating the shaft.

9. The search and warning light system of claim 8 further comprising, in combination: a vertical post; and a light assembly rotatably mounted on the post, with the lamp assembly being mounted in the light assembly, and with the shaft passing through a bore formed in the post and being in a nonrotatable relation with the light assembly.

10. The search and warning light system of claim 1 wherein the second means comprises, in combination: a vertical, stationary shaft, with the lamp assembly being in a rotatable relation with the shaft.

11. The search and warning light system of claim 10 further comprising, in combination: a light assembly being rotatably mounted about the shaft, with the lamp assembly being mounted in the light assembly; and a motor mounted to the light assembly, with the motor being in gearing engagement with the shaft.

12. The search and warning light system of claim 11 further comprising, in combination: a vertical post, with the light assembly being rotatably mounted on the post and with the shaft passing through a bore formed in the post.

13. The search and warning light system of claim 9 or 12 wherein the third means includes a commutator assembly comprising, in combination: contact rings encircling the vertical post; and brush assemblies mounted to the light assembly in sliding engagement with the contact rings.

* * * * *